United States Patent Office 3,440,879
Patented Apr. 29, 1969

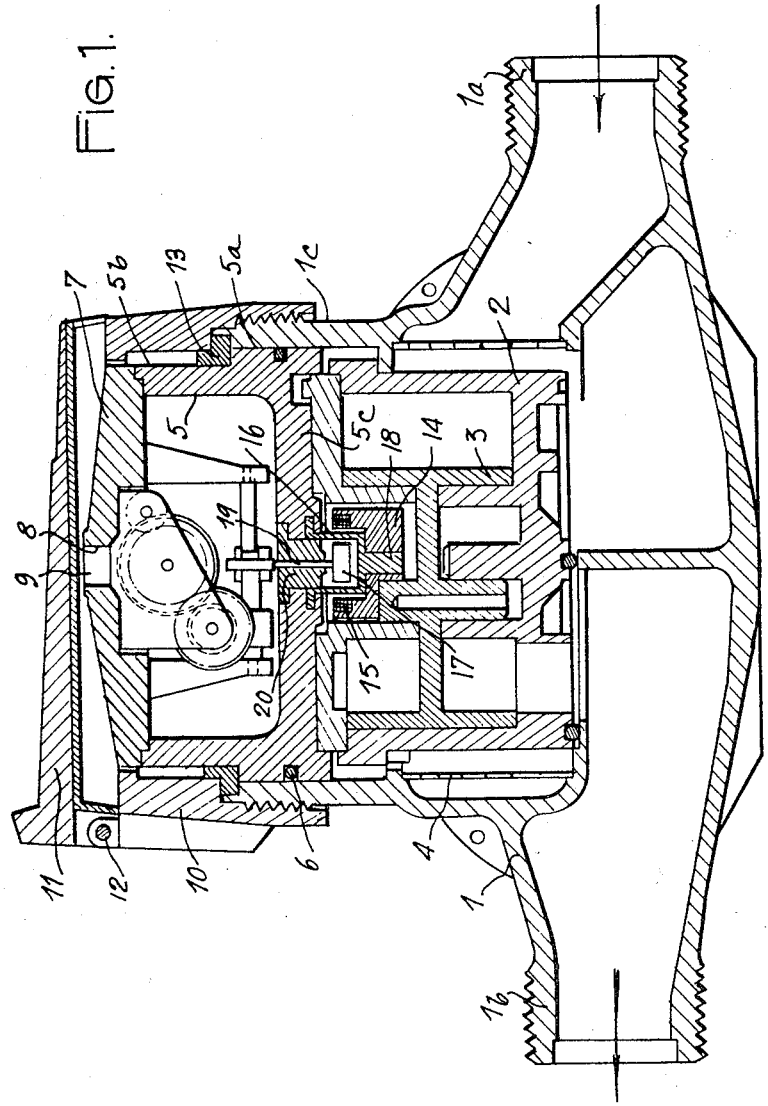

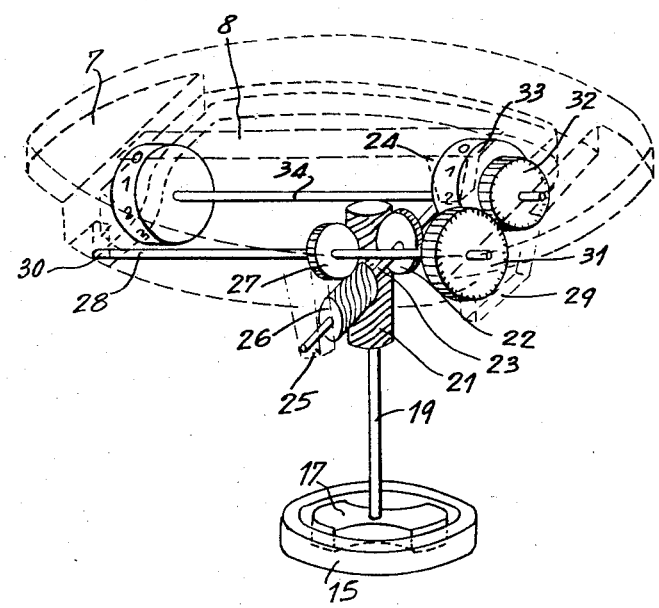

3,440,879
FREEZE PROTECTION FOR A WATER METER
Roland François Edouard Frayssinoux, Paris, France, assignor to Compagnie des Compteurs, Paris, France, a company of France
Filed May 29, 1967, Ser. No. 641,939
Claims priority, application France, May 19, 1967, 106,937
Int. Cl. G01f 1/02
U.S. Cl. 73—277       3 Claims

ABSTRACT OF THE DISCLOSURE

Water meter comprising a cylindrical casing containing the totalizator and its driving mechanism, this casing being placed above a measuring box and having a bottom part of greater external diameter than its top part, said bottom part being slidely mounted inside the top cylindrical part of the meter body and a toric washer housed in a groove made in the casing ensuring seal tightness between the casing and the body. Upon freezing of the meter a ring which retains the casing in place is sheared allowing the casing to slide in the meter body.

---

The present invention relates to an improved water meter, of the type in which the totalizer mechanism is isolated from the measuring chamber so as to shield it from the fluid passing through the meter.

The main object of the invention is to produce a simple and economical appliance, compact, and efficiently protected from freezing, i.e., not risking being damaged in the event of frost.

Another object of the invention consists of providing means enabling it to be ascertained that the meter has been subjected to freezing.

In accordance with the invention, the water meter comprises an open cylindrical body having inlet and outlet piping for the water to be measured, a mobile measuring member actuated by said water flowing from inlet to outlet piping, a measuring box containing said measuring member and housed in said cylindrical body, a cylindrical casing having an open top and slidably fitted in said open cylindrical body to close thereof, a cap having a transparent window and mounted on the open top of said cylindrical casing for closing it, a totalizator mechanism suspended to said cap and viewable through said window and housed inside said cylindrical casing, a magnetic coupling inserted between said measuring member and said totalizator mechanism for driving thereof through said open casing, an annular sleeve surrounding both said cylindrical casing and said cylindrical body and fixedly connected to said cylindrical body while separated from said cylindrical casing whereby said cylindrical casing is substantially free to slide upwardly with respect to said cylindrical body and said annular sleeve, a cover pivotally mounted on said annular sleeve and having bottom thereof at a close distance from said cap closing said cylindrical body whereby said cover is pivoted by said cap when this cylindrical casing is raised in case of freezing of water inside said cylindrical body thus showing such a freezing has taken place.

Other characteristics of the invention will be revealed by the description which follows, made in conjunction with the accompanying drawing, and relating to a non-restrictive example of embodiment.

FIGURE 1 is a sectional view of the meter.
FIGURE 2 is a perspective view of the driving mechanism of its totalizator.

In the figures, we see the open cylindrical body 1 of the meter with its inlet 1a and outlet 1b piping. Inside said cylindrical body is housed, in a manner known in itself, the measuring box 2 containing a mobile measuring member 3, formed, for example, by an oscillating annular piston. A filtering element 4, placed around the box 2, protects the meter from the arrival inopportunely of any solid matter. Above the measuring box 2 a cylindrical casing 5 is placed enclosing the driving mechanism of the totalizator whose various constitutive elements are described in that which follows. The casing 5 partially penetrates into the cylindrical top part 1c of the body 1 against which a toric washer 6 presses placed in a groove made at the bottom part 5a of said casing. The projecting top part 5b of the casing 5 has an appreciably smaller external diameter than the part 5a and is closed by a cap 7 having an orifice of a slot shape, enabling the reading of the particulars of the totalizator through a window 9. An annular sleeve 10, screwed around the cylindrical top part 1c of the cylindrical body 1, is provided with a protecting cover 11 pivotally mounted around a hinge pin 12. Also, there is a ring 13 capable of being sheared in the event of freezing under the effect of the pressure exerted on the casing 5. The ring 13 has, in a manner known in itself, a section with two mutually perpendicular lips, one of which is placed between the top part 5b of the casing 5 and the annular sleeve 10, and of which the other is placed between the sleeve 10 and the top part 1c of the body 1. The ring 13 thus holds the casing 5 in a suitable position.

The rotation of the spindle 3a of the annular piston 3 causes, in a manner known in itself, the rotation of the driving member 14, which is provided at its top part with a bipolar permanent magnet 15 of a rectangular section ring shape. The magnet 15 rotatively drives, through a seal-tight hood 16, a rotatable saturable soft iron part 17 which, as shown in FIG. 2 comprises two opposed arms whose contour is formed by two circular arcs connected by two symmetrical curves passing in the vicinity of the centre. This arrangement, which has the effect of concentrating the lines of force in a zone of reduced section, enables one to control the strength of magnetic reactions perpendicular to the rotation axis. The hood 16 is, at its top part, rigidly connected to the casing 5, whereas at its bottom part, it comprises a pin 18 forming a spindle ensuring the guiding of the driving member 14. The part 17 is integral with a shaft 19 which emerges in the casing 5 whose base 5c comprises a hub 20 traversed by said shaft. At the end of the shaft 19, a worm 21 is mounted which rotatively drives a worm wheel 22, which is mounted on a shaft 23 supported by two brackets 24 and 25 integral with the cap 7. A second worm 26, mounted on the shaft 23, revolves another worm wheel 27 mounted on a shaft 28, which is supported by two brackets 29 and 30, also integral with the cap 7 and placed perpendicularly to the preceding ones. A toothed regulating wheel 31, mounted on the shaft 28, directly drives the toothed wheel 32 which controls the rotation of the first drum 33 of a digital drum totalizator mounted on a shaft 34 parallel to the shaft 28, and supported, likewise, by brackets 29 and 30.

The meter that has just been described is advantageously made of synthetic resin, except for the parts forming its external envelope (open cylindrical body 1 and annular sleeve 10) which are made of metal.

The metering member can be of any kind of type, the oscillating annular piston 3 having been described solely by way of illustration. The replacing of this measuring member could be considered by a disc subjected to a nutation movement or by a radial bladed turbine, for example, the measuring box being then suitably modified.

The permanent magnet 15 can also be four-pole, the part 17 then being in the shape of a cross with four distinct arms offset by 90°, and of the same shape as the two arms described.

In case of freezing, under the effect of the pressure exerted on the base 5c of the casing 5, the ring 13 is sheared, the casing 5 can then be freely raised, its bottom part 5a sliding in the cylindrical part 1c of the body 1, the toric washer 6 ensuring seal tightness between the casing and the body. In rising, the casing 5 not only takes the hood 16 along with it, but all the driving mechanism of the totalizator which is suspended from the cap 7. The cover 11 is then raised, and the forming of ice is thus announced. With the exception of the ring 13, preferably made of plastic material, the essential members of the meter are protected from any deterioration. The arrangements provided also enable damage to be prevented by water when returning to normal temperature conditions. The return to working conditions of the meter only requires the changing of the ring 13 on the spot which is advantageously made in the shape of a split ring.

The other advantages of the meter according to the invention are enumerated hereafter:

The transmission system with worm and worm wheel enable the driving mechanism of the totalizator to be considerably simplified, which only comprises a small number of parts as compared with the mechanisms of conventional meters. This results in a considerable saving of space and reduction in price.

The casing 5 being isolated in a seal-tight manner from the measuring box 2, no moving part, except the measuring member 3 and the driving member 14, are immersed in the liquid.

No condensation capable of hindering the reading of the figures of the totalizator need be feared on the window 9.

The arrangement of the casing 5 enables the mounting of an intermediate plate to be done away with, such as is provided in conventional meters when it is a case of isolating the driving mechanism of the totalizator from the measuring chamber, so as to protect it from the fluid traversing the meter.

Also, we have seen that the arrangements made for the magnetic drive make this drive particularly efficacious.

The employing of plastic materials enables the meter to be manufactured in particularly economical conditions.

I claim:
1. A water meter comprising and open cylindrical body 1 having inlet and outlet piping for the water to be measured, a movable measuring member 3 actuated by said water flowing from inlet to outlet piping, a measuring box 2 containing said measuring member and housed in said cylindrical body, a cylindrical casing 5 having an open top and slidably fitted in said open cylindrical body to close thereof, a cap 7 having a transparent window and mounted on the open top of said cylindrical casing for closing it, a totalizator mechanism suspended to said cap and viewable through said window and housed inside said cylindrical casing, a magnetic coupling inserted between said measuring tmember and said totalizator mechanism for driving thereof through said open casing, an annular sleeve 10 surrounding both said cylindrical casing and said cylindrical body and fixedly connected to said cylindrical body while separated from said cylindrical casing whereby said cylindrical casing is substantially free to slide upwardly with respect to said cylindrical body and said annular sleeve, a cover 11 pivotally mounted on said annular sleeve and having bottom thereof at a close distance from said cap closing said cylindrical body whereby said cover is pivoted by said cap when this cylindrical casing is raised in case of freezing of water inside said cylindrical body thus showing such a freezing has taken place.

2. A water meter as set forth in claim 1 comprising further a breakable ring-shaped washer 13 inserted between said cylindrical casing and said sleeve whereby said breakable ring acts as protecting member preventing accidental sliding of said cylindrical casing without preventing sliding of said cylindrical casing 5 when freezing occurs.

3. A water meter as set forth in claim 1 in which said magnetic coupling comprises a substantially annularly shaped permanent magnet 15 and a soft iron armature 17 having a narrow center portion and at least two protruding arms provided with enlarged circular arc shaped ends whereby said narrow center is magnetically saturated by said permanent magnet, said narrow center of said armature being rigidly connected to said totalizator mechanism and said annularly shaped permanent magnet being connected to said measuring member and a hood rigidly connected to said cylindrical casing enclosing completely said armature.

References Cited

UNITED STATES PATENTS

| 1,563,769 | 12/1925 | Marden | 73—272 X |
| 2,354,563 | 7/1944 | Weisse | 73—272 |
| 2,566,220 | 8/1951 | Lindley et al. | 73—257 |
| 3,377,858 | 4/1968 | Berette | 73—258 |

FOREIGN PATENTS

| 358,160 | 12/1905 | France. |
| 377,125 | 6/1964 | Switzerland. |
| 443,333 | 2/1936 | Great Britain. |
| 594,330 | 7/1929 | Germany. |
| 637,959 | 5/1950 | Great Britain. |
| 1,220,128 | 1/1960 | France. |
| 560,155 | 9/1932 | Germany. |

RICHARD C. QUEISSER, *Primary Examiner.*

E. D. GILHOOLY, *Assistant Examiner.*

U.S. Cl. X.R.

73—257; 116—132